UNITED STATES PATENT OFFICE.

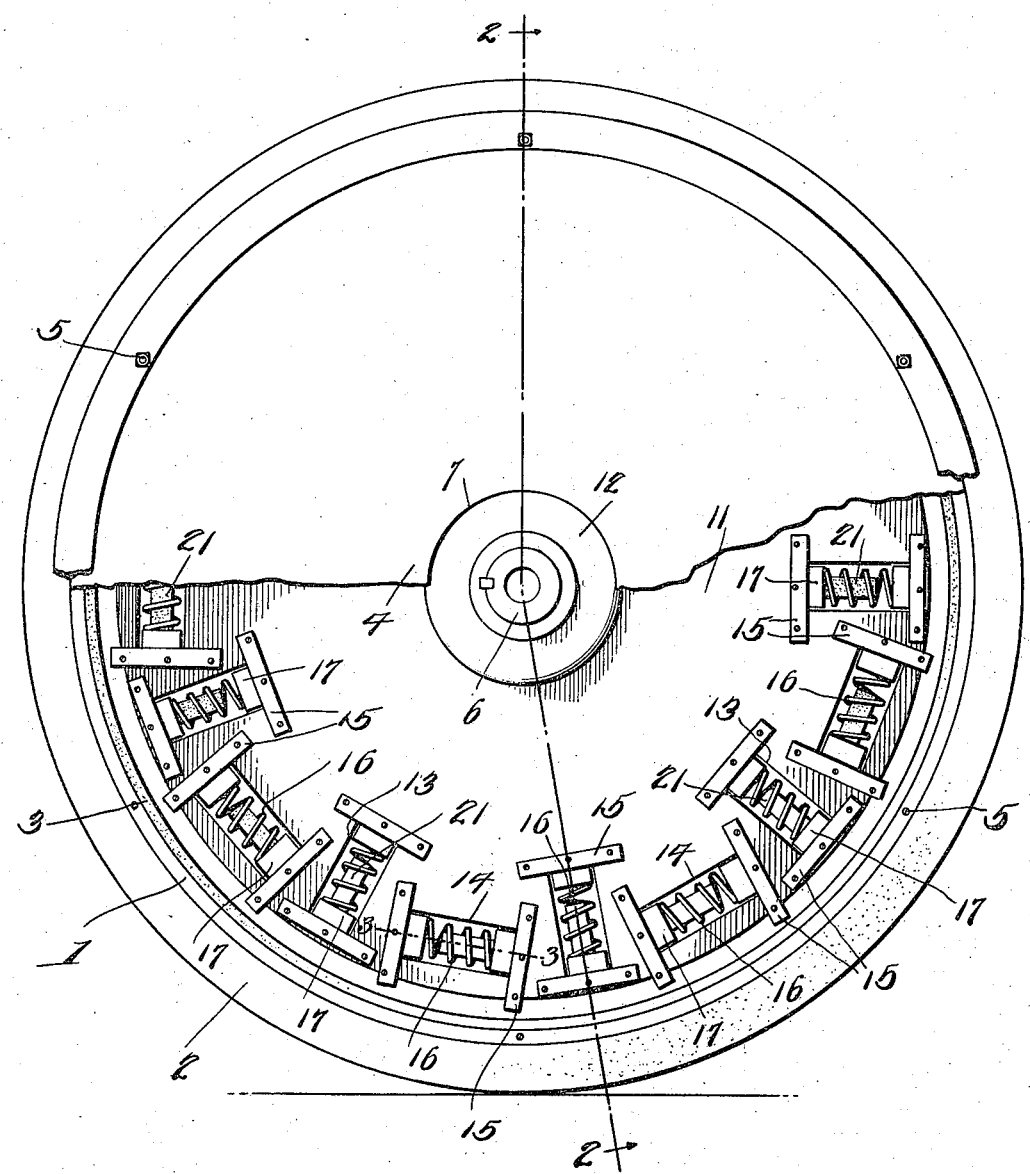

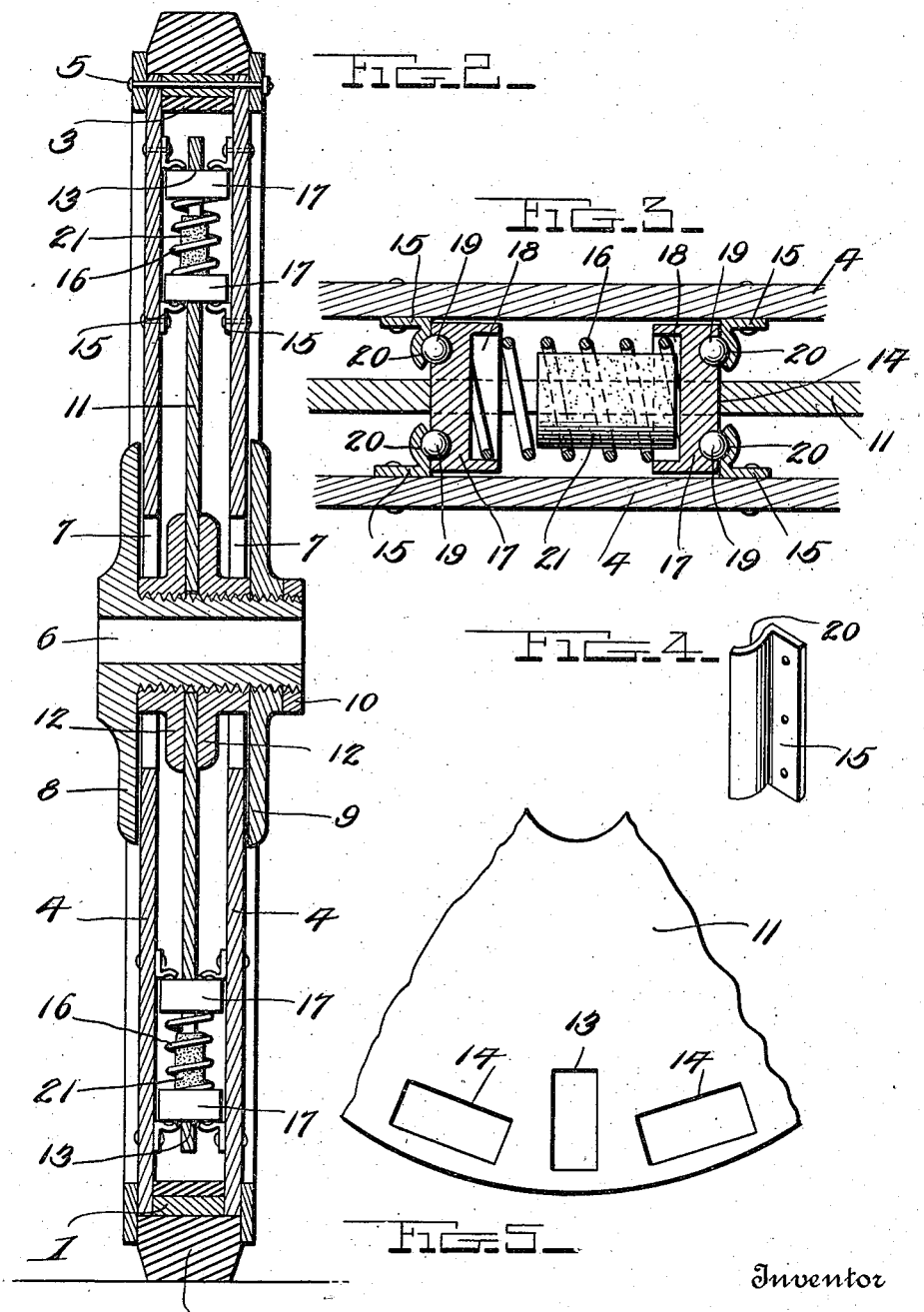

FRED LEE BENEDICT, OF JERSEY CITY, NEW JERSEY, ASSIGNOR OF ONE-HALF TO ANTHONY MEYER, OF MAYWOOD, NEW JERSEY.

SPRING-WHEEL.

1,241,906.   Specification of Letters Patent.   Patented Oct. 2, 1917.

Application filed January 22, 1917. Serial No. 143,709.

*To all whom it may concern:*

Be it known that I, FRED LEE BENEDICT, a citizen of the United States, residing at Jersey City, in the county of Hudson and State of New Jersey, have invented certain new and useful Improvements in Spring-Wheels; and I do declare the following to be a full, clear, and exact description of the invention, such as will enable others skilled in the art to which it appertains to make and use the same.

My invention has for its object to provide a simply constructed and efficient spring wheel designed primarily for use on motor vehicles although it is also well applicable to gun carriages, wagons, and the like.

With the foregoing general object in view, the invention resides in certain novel features of construction and in unique combinations of parts to be hereinafter fully described and claimed, the descriptive matter being supplemented by the accompanying drawings which constitute a part of this application and in which:

Figure 1 is a side elevation of the improved wheel with a portion of one of the side plates removed;

Figs. 2 and 3 are sectional views on the planes of the lines 2—2 and 3—3 of Fig. 1;

Fig. 4 is a perspective view of one of the spring abutments; and

Fig. 5 is a side elevation of a portion of the central disk.

In the drawings above briefly described, the numeral 1 has reference to an appropriate rim equipped with a tire 2 of solid rubber or any other appropriate material while the inner side of said rim is faced with a lining 3 of rubber or yielding material of any other character for a purpose to be set forth.

A pair of side plates 4 are secured by bolts 5 to the opposite edges of the rim 1 and said plates preferably extend to the hub 6 of the wheel, being formed at their centers with openings 7 through which the body of said hub projects loosely as shown in Fig. 2. One end of the hub 6 is provided with an annular flange 8 contacting slidably with the outer face of one of the plates 4, while a ring 9 is preferably threaded on the other end of the hub body in sliding contact with the other plate 4, said ring being locked against movement by a nut 10.

Mounted on the hub between the plates 4 is a disk 11, clamping rings 12 being shown threaded on the hub for securing said disk in place, the latter being also keyed to the hub if the wheel is to be used for driving purposes. It may be here stated that any means other than the rings 12 may be employed for securing the disk 11 to the hub and that the general hub construction may be varied as occasion may demand, the construction shown and described being for illustrative purposes only.

The periphery of the disk 11 is spaced inwardly a slight distance from the resilient lining 3 and at circumferentially spaced points adjacent said periphery, the disk is formed with radially extending slots 13 and between these slots with circumferentially extending slots 14. Spring abutments 15 are riveted or otherwise secured to the inner faces of the side plates 4 so as to extend across the ends of the slots 13 and 14 and coiled springs 16 are housed in said slots with their ends engaging the abutments as shown clearly in Figs. 1, 2 and 3.

In most cases the springs 16 will be provided on their ends with shoes 17 having sockets 18 receiving said springs, the outer faces of said shoes being equipped with ball bearings 19 for contact with the abutments 15 to reduce friction. The abutments in question are preferably formed of angle metal with one flange riveted to the plates 4 and the other flange extending inwardly from said plates and so stamped as to form longitudinal grooves 20 in which the ball bearings 19 are received.

By constructing the improved wheel as or substantially as shown and described, it will be highly efficient not only in absorbing shocks and jars but in elastically transmitting driving power from the engine. Furthermore, the arrangement of cushioning springs is such as to cause the axis of the wheel, when the vehicle is traveling on a smooth surface, to travel in a plane parallel with the roadway and not on an undulating course as is the case with many of the spring wheels heretofore devised. When excessive shocks are encountered the springs 16 will so yield as to cause rubber cushions 21 therein to come into play and at approximately the same time the edge of the disk 11 will strike the cushion 3 to prevent the springs from compressing to such an extent as to momentarily destroy their efficiency as cushioning devices.

In constructing heavy wheels for gun carriages, trucks and the like, several units like that above described may be disposed on the same hub and provided with a single rim. Also, by placing a plurality of the improved wheels in closely spaced relation on the same shaft, an effective roller is provided, it being obvious that such obstructions as will not press into the earth will merely cause one or more of the sections of the roller to yield upwardly instead of lifting the same approximately throughout its length.

I claim:

1. A resilient wheel comprising a rim, a pair of side plates extending inwardly therefrom, a hub, a disk secured to said hub and extending between said side plates, said disk having alternate radially and circumferentially extending slots, radially and circumferentially extending coiled springs located respectively in said radially and circumferentially extending slots, and abutments secured to the inner faces of the side plates and receiving the ends of said springs slidably.

2. A spring wheel comprising a rim, a pair of side plates secured to and extending inwardly from said rim, a hub, a disk secured to said hub and extending between said side plates with its periphery spaced from the rim, said disk having alternate radially extending and circumferentially extending slots, coiled springs disposed lengthwise in said slots, shoes on the ends of said coiled springs having ball bearings at their outer sides, and abutments secured to the inner faces of said side plates and having grooves receiving said ball bearings therein.

In testimony whereof I have hereunto set my hand in the presence of two subscribing witnesses.

FRED LEE BENEDICT.

Witnesses:
JAMES HENRY MUTH,
FRED GEORGE MEINE.

Copies of this patent may be obtained for five cents each, by addressing the "Commissioner of Patents, Washington, D. C."